United States Patent [19]
Grant et al.

[11] 3,832,711
[45] Aug. 27, 1974

[54] GUIDANCE SYSTEM

[75] Inventors: George H. Grant, Sudbury; Joseph D. Hadad, Methuen, both of Mass.

[73] Assignee: Raytheon Company, Lexington, Mass.

[22] Filed: Apr. 13, 1964

[21] Appl. No.: 360,174

[52] U.S. Cl.......... 343/6 DF, 244/3.19, 343/100 LE, 343/117 R, 343/118
[51] Int. Cl............................ G01s 9/00, G01s 9/02
[58] Field of Search..... 244/14 J, 14 C, 14 E, 14 H; 343/100.12, 7.4, 117, 118, 6 DF; 325/303

[56] References Cited
UNITED STATES PATENTS

| | | | |
|---|---|---|---|
| 2,471,412 | 5/1949 | Clark | 325/303 X |
| 2,950,880 | 8/1960 | Chance et al. | 343/7 X |
| 2,964,266 | 12/1960 | Flichs | 343/7.4 X |
| 3,084,340 | 4/1963 | Stout et al. | 343/117 X |
| 3,181,813 | 5/1965 | Gulick, Jr. et al. | 244/145 |

*Primary Examiner*—Malcolm F. Hubler
*Assistant Examiner*—Richard E. Berger
*Attorney, Agent, or Firm*—Leo R. Reynolds; Philip J. McFarland; Joseph D. Pannone

EXEMPLARY CLAIM

17. A source locating system comprising:
    a receiver means responsive to harmonics of radiating source signals for providing an error signal proportional to the location of said source with respect to said receiver means;
    and an acquisition radar receiver means for selecting a radiating source and providing source discrimination signals to said receiver means.

17 Claims, 4 Drawing Figures

INVENTORS
GEORGE H. GRANT
JOSEPH D. HADAD

BY Leo R. Reynolds
AGENT

GUIDANCE SYSTEM

This invention relates to guidance systems which provide information to a vehicle to direct it toward a desired location. More particularly, the invention relates to a missile which homes on radiation, sometimes referred to as an anti-radiation missile.

Manned aircraft have been, and will continue to be, one of the principal means of weapons delivery in modern warfare. Manned aircraft combine accurate delivery of projectiles with the capability of reconnaissance, surveillance, and recall, and can utilize the intelligence of airborne observers within the aircraft for location and identification of ground targets. If allowed to roam freely in the airspace over the battlefield, aircraft can be the decisive factor in the ground engagement.

To counter this threat, highly effective ground-based anti-aircraft defenses are being developed and deployed to reduce the probability of aircraft penetration of battle areas to such levels that sustained use of aircraft becomes impractical. These defense systems have one thing in common: they all use some form of radiation such as radar for search acquisition, tracking or fire control. Accordingly, the need exists for an anti-radiation missile which will effectively counter this vital part of an enemy's air defense posture.

The radiation from the aforementioned defense systems may lie in any one or several of the plurality of frequency bands available to radar devices. For example, a search radar may be present and operating in the $x$-band (9–12 gc) region adjacent a tracking radar operating in the $c$-band (4.5–6 gc) region. This invention discloses that inherent nonlinearities of components associated with the r.f. sources of such radars generate sufficient harmonic power to enable a suitably adapted missile seeker to detect such harmonics and generate information as to the coordinate position of said source with respect to an arbitrary reference. Thus, for example, the second harmonic of the $c$-band source lies in the $x$-band region and a missile having an $x$-band receiver may be employed to track and destroy the $c$-band source.

Accordingly, it is an object of the present invention to provide a missile seeker which operates on an harmonic homing principle. For example, a missile is provided which is capable of sensing the fundamental of one frequency band being transmitted, for example, $x$-band, and harmonics of a plurality of remaining frequency bands being transmitted, for example, $c$, $l$ and $s$ bands. Certain harmonics of the $c$, $l$ and $s$ bands lie in the frequency band of the fundamental ($x$-band). Use of the harmonic homing principle provides the following advantages over known anti-radiation missiles: (1) Because only radiation signals within the selected fundamental frequency are received, the same seeker is effective against all expected radiation bands. (2) Because sufficient power in the fundamental band exists in the harmonic content of sources transmitting in the nonfundamental bands, an effective compression of the enemy frequency band is achieved which permits the sensor apparatus in the missile seeker, such as the receiving antenna, to be optimized for the fundamental band, thereby contributing to enhanced multiple target resolution. (3) In the case of radiation sources operating at other than the fundamental band, reception by the missile seeker of the harmonics effectively broadens the normally high directivity pattern of the source. In other words, a radar operating at, for example, $c$-band, normally has a narrow beam pattern of $c$-band energy in the direction of radiation. However, the harmonics of the $c$-band radiation are not narrow in beam width; hence the missile seeker will be supplied with continuous radiation from the source even when the source is a rotating search radar.

In general, therefore, the system in accordance with the invention comprises a passive ferret receiver for detecting and locating sources of radiation including means responsive to the fundamentals of one band of frequency signals and the harmonics of lower bands of frequency signals.

There is further provided in accordance with the invention a side-lobe comparator circuit which rejects signals emanating from sources not located in the path of the main lobe of the receiver beam.

Additionally there is provided a circuit for rejecting signals caused by reflections and multi-path transmission of the source signal comprising a leading edge tracking circuit which operates on the principle that the direct path to the missile from the radiating source will always be the shortest. Thus, the first pulse arriving at the missile for a given pulse repetition frequency is selected by the leading edge tracking circuit since this pulse contains the correct directional information.

The foregoing and additional features of the invention will become apparent from a detailed description of an embodiment thereof which follows. This description refers to the accompanying drawings wherein.

Figure 1:
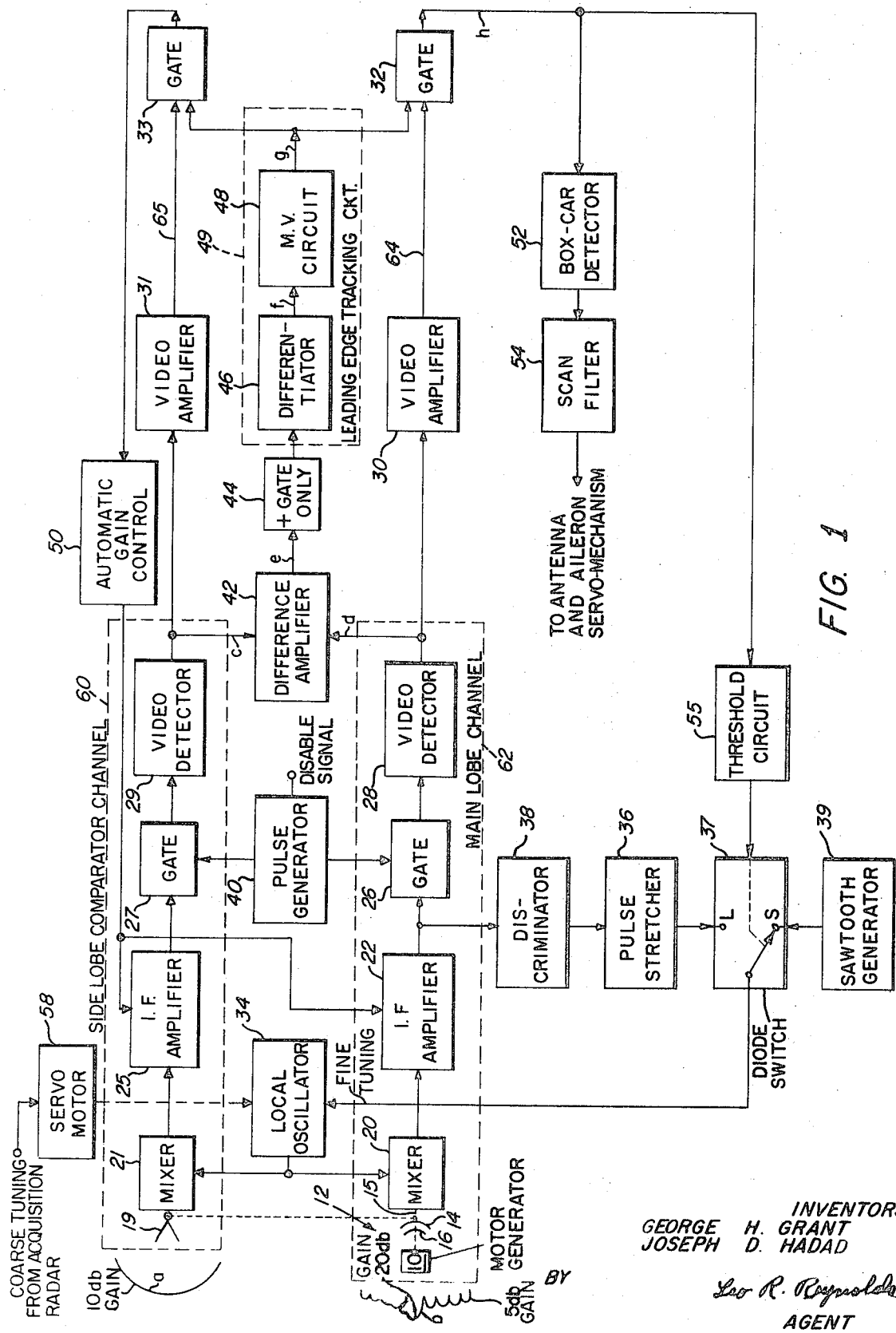
FIG. 1 is a block diagram of the missile receiver apparatus of the invention.

Referring now to FIG. 1, there is shown a missile guidance system comprising a narrow band receiver capable of operating over a wide spectrum of a band of energy signals such as, for example, the $x$-band (9–12 gc.) which accepts, modulates and detects radiated signals emanating from sources operating at $x$-band and harmonics of other signal sources, which harmonics lie in the $x$-band region. Antenna assembly 12, which may as shown comprise a Cassegrainian lens system, receives plane wave energy from a radiating source at primary parabolic reflector 14 and converts it to a spherical wave which is reflected by hyperbolic secondary reflector 16 in the form of another spherical wave which is received by, for example, a polyrod end-fired feed 15.

The received signal is conically scanned to provide directional information with respect to the source of the received signals for tracking or homing purposes. Scanning is achieved by tilting the hyperbolic reflector about its axis by means of scan motor-generator 10. This displaces the vertical image of the hyperbolic surface from the axis of the parabolic surface, thereby tilting the received energy beam off the parabolic axis. The tilt angle is fixed and the hyperbolic reflector 16 rotated about the antenna axis, scanning or amplitude modulating signals entering the main beam of the antenna as it rotates. Reference is had to pages 166–175 of the text *Introduction to Radar Systems* by Merrill I. Skolnik, McGraw Hill Book Co., Inc. 1962 for a complete analysis of such a conical scanning system. It should be noted that sequential lobing and monopulse scanning described on pages 165–166 and 175–184 respectively of the referenced text could be used in place of the aforementioned conical scanning system.

In the conical scan system, as thus described, the received signal is amplitude modulated at a rate equal to the rate of rotation of the hyperbolic surface, that is, at the speed of the motor 10. The amplitude of the modulations is proportional to the angle between the target (radiating source) line of sight and the antenna rotation axis. The phase of the modulations indicates the direction of the angle between the target and the rotation axis.

The conically scanned signals from the antenna assembly 12 are coupled to a wide band balanced microwave mixer 20 wherein they are mixed with a local oscillator signal from local oscillator 34 to produce a 30 mc. IF signal which is coupled to IF amplifier 22. Local oscillator 34 may comprise, for example, a variable frequency klystron, traveling wave tube or the like. The IF amplifier preferably should have a high gain in the order of 90 db's, and is gain controlled from AGC circuit 50 preferably at least a 60 db dynamic range in order to eliminate amplitude variations expected on the signal due to such variables as target antenna scan and target range. In the event the incoming signal is a c.w. (continuous wave) signal, the last stage of the IF amplifier is gated in gate 26 by pseudo pulse repetition frequency modulations from pulse generator 40. If the incoming signals are pulsed signals then the pulse generator and gating circuit are disabled prior to launch by an electrical signal not shown from an external observer in a plane or other observation point.

The IF output signal from amplifier 22 is also coupled to a frequency discriminator 38. Frequency discriminator 38 provides an output signal having an amplitude proportional to the frequency of the input to it. For example, frequency discriminator 38 may comprise a circuit having a voltage cross-over point set at the IF frequency of 30 mc.

The output from discriminator 38 is coupled to a well-known pulse stretcher or integrator circuit 36 which converts the pulses from discriminator 38 to a d.c. voltage. The d.c. voltage is coupled through the "L" or lock position of diode switch 37 to a frequency control electrode of the local oscillator 34. This d.c. voltage from pulse stretcher 36 pushes the frequency of the local oscillator so that the IF signal into the discriminator 38 is maintained at the cross-over point of the discriminator characteristic.

In the absence of a sufficient number of pulse signals of predetermined signal-to-noise ratio, for example 13 db at threshold detector 55, local oscillator 34 is electronically swept over a narrow frequency range, for example ±50 mc, by a sawtooth voltage signal from sawtooth generator 39. Sawtooth generator 39 generates a sawtooth voltage which is coupled to the "S" or sweep position of diode switch 37. Diode switch 37 is placed in the "L" or lock position by a signal from threshold circuit 55. The input signal to threshold circuit 55 is the video pulses passed through gate circuit 32. When these pulses are of sufficient signal-to-noise ratio, for example, 13 db's as measured by the threshold circuit 55, a signal is coupled from the threshold circuit 55 to diode switch 37, placing the switch in the "L" or lock position.

Signals passing through gate 26, be they cw or pulse signals, are amplitude detected in well known video detector 28, amplified in video amplifier 30 and applied to gate circuit 32.

Assuming for the moment the presence of a coincidence signal from leading edge tracking circuit 49 at gate 32 which is time coincident with the signal from video amplifier 30, the video amplified signal is coupled from gate 32 to boxcar detector 52. The boxcar detector eliminates the pulse repetition frequency and passes the conical scan modulations to scan filter 54. The conical scan modulations are filtered and pass through scan filter 54 to provide an error signal, indicative of target position, to the antenna and aileron servomechanisms (not shown). A representative circuit for processing the error signal from scan filter 54 to provide tracking or homing of a missile is shown in FIG. 5.3, page 167 of the aforementioned text by Skolnik.

The foregoing description describes the circuitry required for processing either fundamental $x$-band signals or harmonic radiation signals lying in the $x$-band region so as to locate the source of said signals. The following description is concerned with improvements thereover for eliminating undesired side-lobe signals and for eliminating spurious signals caused by reflections and multipath transmission of radiated signals.

Signals from sources located at points other than in line with the main antenna lobe or beam pattern of the antenna assembly 12 may be received through the side lobes. If these so-called "side-lobe" signals are of sufficient level when transmitted as compared with the signals entering through the main lobe, they could very well cause an erroneous indication of target location. Accordingly, there is provided a side-lobe comparator receiver channel 60 comprising side-lobe antenna 19, mixer 21, IF amplifier 25, gate circuit 27 and video detector 29. The side-lobe receiver channel provides a signal at the output of video detector 29 which when compared in difference amplifier 42 with a signal from the main-lobe antenna channel 62 will produce output signals of a predetermined polarity, such as positive with respect to a certain reference level, from difference amplifier 42 in time coincidence with signals received within the main lobe only. The output of difference amplifier 42 will be of an opposite polarity during time intervals coincident with side-lobe signals.

Side-lobe antenna 19 is mechanically coupled or gimbaled to antenna assembly 12. The beam pattern of antenna assembly 12 is as shown in FIG. 1, curve $b$. Curve $b$ is a one-dimensional plot of antenna gain at $x$-band frequency versus degrees off axis. It may thus be seen that signals from radiating sources which are directly in line with the axis of antenna assembly 12 will receive a 20 db gain as contrasted to signals from sources located off-axis and in the side-lobes which receive only a 5 db gain. However, the off-axis source may be transmitting at a greater power level than the desired on-axis source. For example, the off-axis source may be transmitting at +20 dbw, whereas the on-axis source is transmitting at 0 dbw. In the absence of a side-lobe comparator channel, the off-axis signal would therefore appear to the receiver to be the largest amplitude signal. The conical scan modulations on the off-axis signal would, if the off-axis source is transmitting at frequencies within the frequency bandwidth of IF amplifier 22, be detected at boxcar detector 52 and used as error signals for the antenna and aileron servomechanisms. However, the conical scan information on off-axis signals does not truly represent the source location with respect to the "on" or main axis of the antenna beam. Hence, the missile would be improperly directed toward neither of the sources. The present invention precludes this possibility by providing a side-lobe comparator channel as aforementioned which effectively suppresses signals received through the receiver antenna side-lobes.

In the side-lobe comparator channel 60 the side-lobe antenna 19 has a broad beam antenna pattern, curve a, having a gain which lies intermediate the main-lobe gain and side-lobe gain pattern of the conical scan antenna assembly 15. For example, the gain at all angles is 10 db. Assume the 20 db main-lobe and 5 db side-lobe parameters presently postulated for antenna assembly 12 and also for illustrative purposes that the same two sources previously mentioned are radiating at frequencies, be they fundamentals or harmonics, which lie within the IF amplifier bandwidth and at a power level of 20 dbw off-axis and 0 dbw on-axis. Both signals will be processed in an identical fashion through channel 60 as signals processed through channel 62 with the exception that both on-axis and off-axis signals in channel 60 will receive a 10 db gain in channel 60 because of the gain of antenna 19. For example, FIG. 2, curve c represents the output of video detector 29 for two pulse repetition periods under the assumed conditions and FIG. 2, curve d represents the output of video detector 28 for the same period of time. It should also be noted that the signals in channel 60 have not been conically scanned and hence are not amplitude modulated. Furthermore, the amplitude values on both curves should be multiplied by a constant factor $k$ representing the gain in each channel which gain should preferably be matched, i.e., the same in each channel. The cross-hatched signal on curves c & d represents the undesired signal coming in on the side-lobe pattern of antenna assembly 12.

The output signal from video detector 29 is coupled to the negative side of difference amplifier 42 and the output signal from video detector 28 is coupled to the positive side of difference amplifier 42. Difference amplifier 42 provides an output signal, curve e of FIG. 2, proportional to the algebraic difference between the two input signals. It may thus be seen that difference amplifier 42 has a positive output only when signals received through the main lobe are present. This condition will always occur by virtue of the antenna gain of antenna 19 having been established intermediate the main-lobe and side-lobe gain of antenna 12.

The positive going signals are passed through gate circuit 44, whereas negative going signals are suppressed.

The output of gate circuit 44 is applied to a leading edge tracking circuit 49 comprising a differentiator circuit 46 and a multivibrator circuit 48. The leading edge tracking circuit provides a pulse which starts time coincident with the leading edge of signals applied to it and terminates at a predetermined time established by the RC (resistance-capacitance) parameters of the multivibrator circuit. The pulse duration of the output signal from leading edge tracking circuit 49 is preferably made sufficiently shorter time-wise than the time it takes for transmitted r.f. signals to travel a predetermined distance X, for example, 150 feet.

Figure 2:
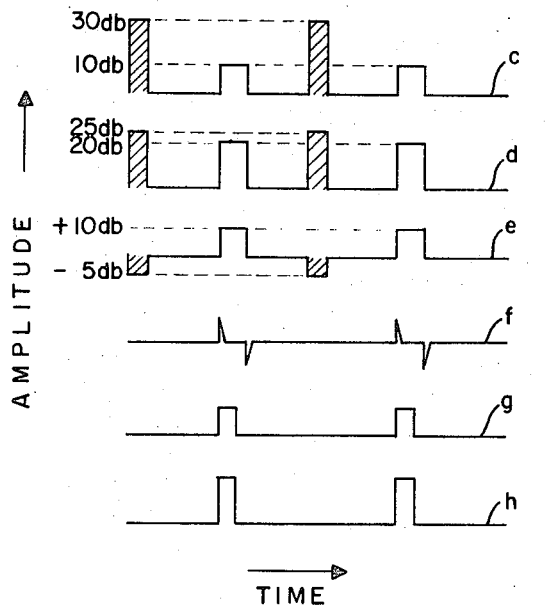
FIG. 2 shows waveforms of FIG. 1 at various locations.

Differentiator 46 in leading edge tracking circuit 49 differentiates the positive going signal applied to it from gate circuit 44 to produce the signal shown on line f of FIG. 2. Multivibrator circuit 48 is responsive only to the positive pulse from differentiator 46. In response to these positive pulses it produces pulses such as those shown on curve g, FIG. 2, which are of sufficient pulse width to enable detection in boxcar detector 52 but short enough to eliminate video pulses caused by reflections of the transmitted pulse. The output of leading edge tracking circuit is applied to time coincidence gating circuits 32 and 33. The video amplified input signals from the main-lobe channel 62 and side-lobe channel 60 are also coupled to gating circuits 32 and 33 respectively. When two input signals are present simultaneously at the input to gate circuit 33 the signal on line 65 is passed. Accordingly, video signals representing reflections of the transmitted signal from objects located at distances greater than the predetermined distance X from the source are effectively blocked out by the leading edge tracking circuit since the pulse width of the time-coincidence signal from multivibrator circuit 48 is less than the one-way transit time of an r.f. signal traveling X feet. Furthermore, only signals appearing on the main lobe of antenna assembly 12 are passed through gates 32 and 33 since the leading edge tracking circuit responds only to signals from gate 44 and signals from gate 44 only occur in time coincidence with main lobe signals as afore-related.

Since the signals at gate 32 are the conically scanned signals, they are coupled to boxcar detector 52 and provide an error signal indicative of the target (radiating source) location. The signals at gate 33 are coupled to an AGC circuit 50 which controls the gain of IF amplifier 25 to prevent saturation and maintain the d.c. level of the receiver constant.

Because of the wide frequency coverage capability of the missile receiver by virtue of its harmonic detection circuitry it is often desirable to pre-lock the receiver to the frequency of a predetermined or selected target. In this manner signals of a different frequency from extraneous sources will not be processed through the first detector or IF amplifier stage. In other words, signals not within the 4 mc bandwidth of the IF amplifier will not be further detected and hence will be effectively discriminated against by the missile.

Figure 3:
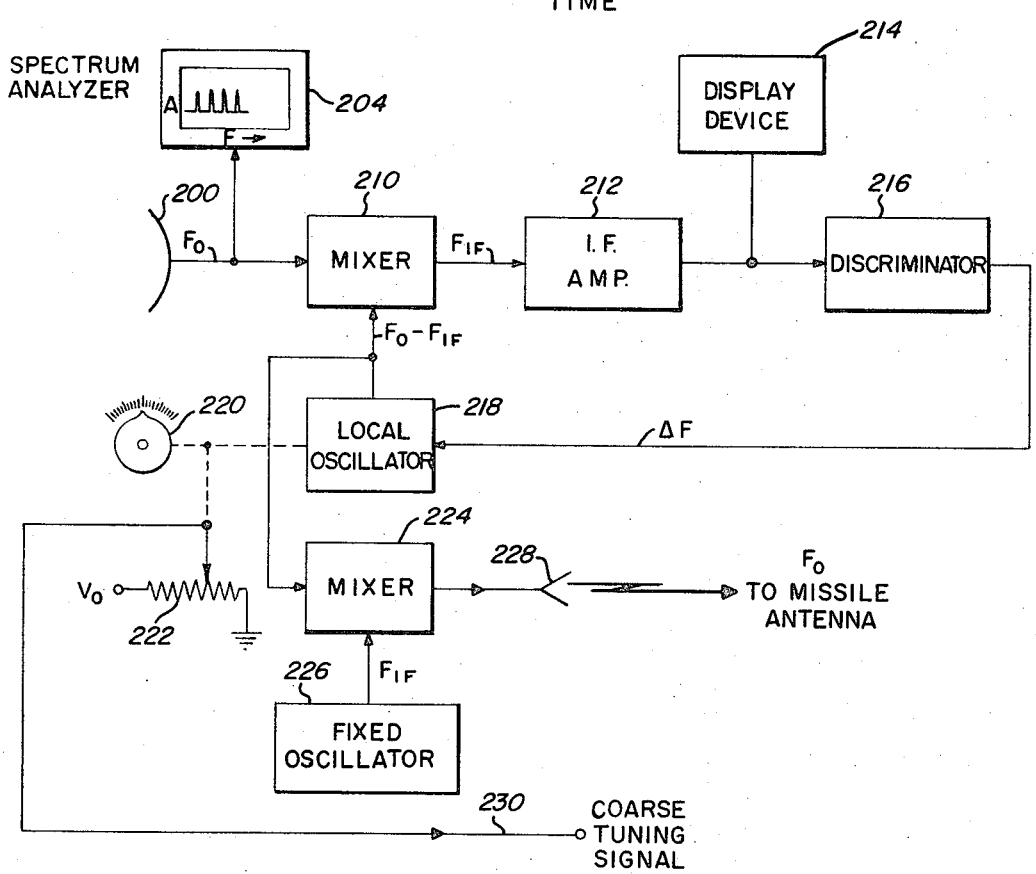
FIG. 3 is a block diagram of an acquisition radar receiver of the invention.

Accordingly, there is further provided in accordance with the invention the acquisition radar receiver of FIG. 3, which, for example, may be located in an airplane from which the missile is launched or at a ground location and may be coupled either by cables or RF communication to the missile. The acquisition radar receiver detects, locates and designates targets to the missile.

Thus, for example, the acquisition radar receiver may comprise a high gain antenna 200 having a large captive area capable of receiving harmonics of radiating signals at sufficient level to be detected at a greater distance than the relatively small antennas provided in missiles such as the missile antenna of FIG. 1. Signals, be they harmonics or fundamentals accumulated by antenna 200, are coupled to spectrum analyzer 204. The radar receiver operator, not shown, coarse tunes the radar receiver to a selected one of the signals shown on spectrum analyzer 204. Tuning is accomplished by varying the frequency of local oscillator 218. The local oscillator may comprise a klystron, backward wave oscillator or the like. Assuming, for example, that local oscillator 218 is a klystron, tuning is accomplished by mechanically varying the klystron cavity with knob 220 coupled to the klystron cavity.

The local oscillator is varied in frequency until the selected signal appears on display 214 which may comprise, for example, a cathode ray tube display device. The local oscillator signal is tuned so as to be substantially equal to the selected input signal $F_o$ minus a 30 mc. intermediate frequency signal $F_{iF}$. The local oscillator signal is mixed or beat in balanced mixer 210 with the selected incoming signal $F_o$ to produce the difference signal $F_{iF}$. The signal $F_{iF}$ is amplified in IF amplifier 212 and coupled to display device 214 which may, as aforementioned, comprise a cathode ray tube device. A portion of the amplified IF signal is coupled from IF amplifier 212 to discriminator circuit 216 which circuit provides an output signal $\Delta F$ proportional to the deviation of the IF signal from 30 mcs. The $\Delta F$ signal is coupled to a control electrode of local oscillator 218 and drives the local oscillator signal to precisely the desired frequency $F_o - F_{iF}$.

A portion of the local oscillator signal $F_o - F_{iF}$ is mixed in mixer 224 with a fixed reference signal $F_{iF}$ of 30 megacycles to reproduce at the output of mixer 224 the selected $F_o$ signal. The reproduced $F_o$ signal is transmitted from horn 228 to antenna 12 of the missile of FIG. 1, thereby providing a pseudo-radio frequency signal to which the missile receiver can be pretuned, preferably before launching.

Simultaneously with supplying the pseudo-radio frequency signal the coarse tune setting of the local oscillator 218 in the radar is coupled to the missile local oscillator. This may be accomplished by tapping a voltage off potentiometer 222 proportional to the mechanical setting of the radar local oscillator cavity and coupling this voltage by cable 230 to servo-motor 58 in FIG. 1. The servo-motor 58 is electromechanically coupled to the missile local oscillator 34 and positions its cavity in conformity to the selected radar receiver setting.

Figure 4:
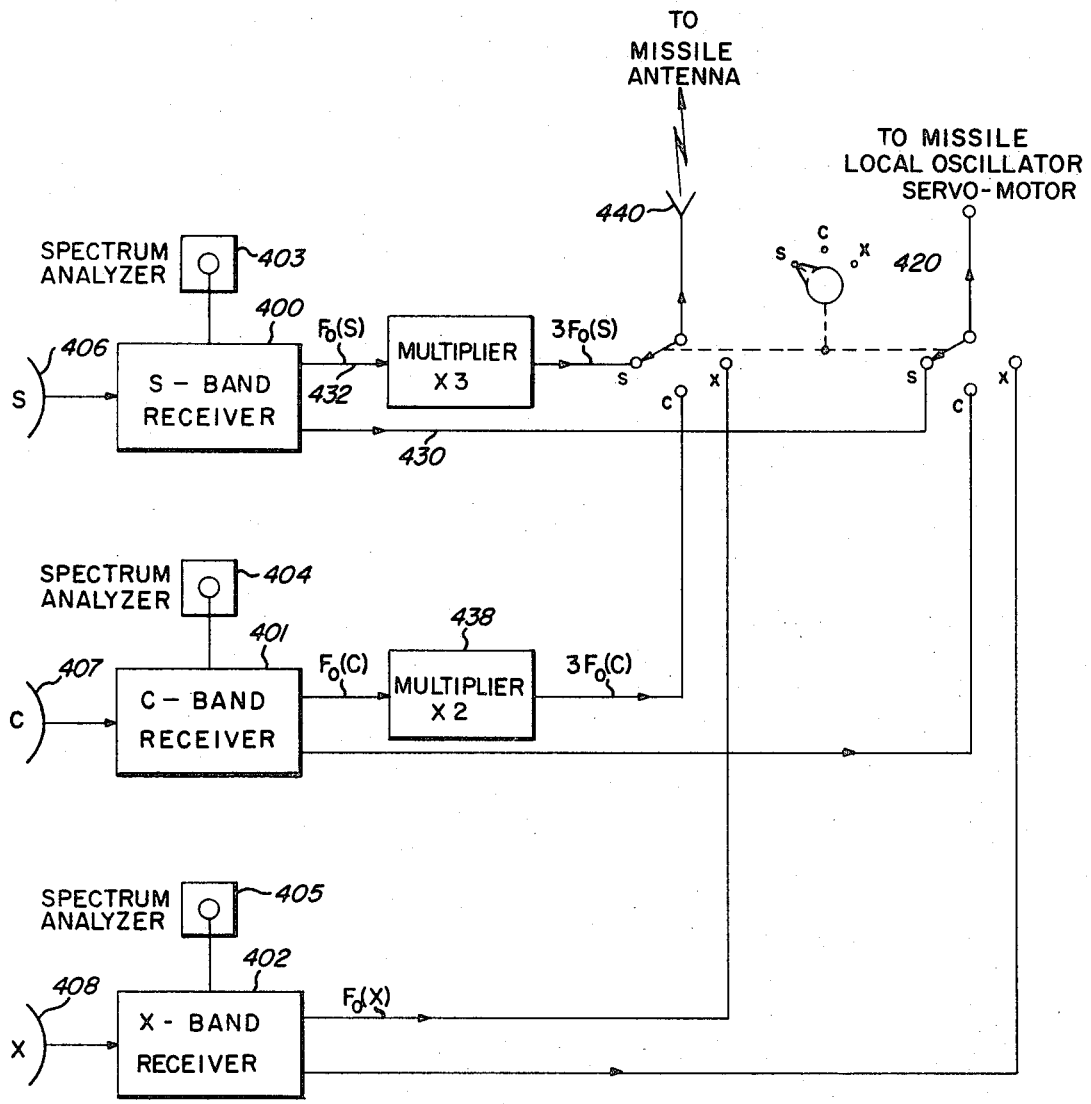
FIG. 4 is a block diagram of an alternate embodiment of an acquisition radar receiver of the invention.

It is contemplated that it may be desirable to launch the missile at a distance from the target greater than the maximum feasible distance for receiving harmonics of the fundamental radiating source. In this event a sufficient number of acquisition radar receivers such as shown in FIG. 3 would be required so as to receive at the fundamental of each band. For example, as shown in FIG. 4, three receivers 400, 401 and 402 covering the $s$, $c$ and $x$-band respectively with their associated frequency spectrum analyzers 403–405 and antennas 406–408 may be provided to detect and display signals representing the fundamental frequency content of radiating sources in the $s$, $c$ and $x$ frequency bands. The radar receiver operator selects the desired band by means of switch 420 and tunes the selected receiver (either 400, 401 or 402) to the desired signal in the manner described in connection with FIG. 3. For example, assuming switch 420 is in the $s$ position, tuning the $s$-receiver 400 provides a coarse tuning voltage in the same manner as that described in connection with FIG. 3 at lead or wire 430 which is coupled through switch 420 to the missile local oscillator servo-motor and positions the missile local oscillator at the approximate frequency 30 megacycles removed from the third harmonic of the selected input signal to the $s$-band receiver.

When the s-band receiver is locked on to the desired signal by means of its AFC and discriminator circuitry, not shown, an output signal $F_o(s)$ is received at line 432 proportional in frequency to the desired or selected s-band signal in the same manner as the circuit of FIG. 3. However, this signal $F_o(s)$ is not within the bandwidth of the missile receiver and hence must be multiplied by a factor of 3 to its corresponding $x$-band harmonic. This is accomplished by coupling the signal $F_o(s)$ to harmonic multiplier 436 which may comprise, for example, a non-linear device such as a varactor diode circuit for obtaining multiples of the input signal. The third harmonic of the signal $F_o(s)$ is coupled through switch 420 to horn 440 and transmitted to the missile antenna 12 to provide a pseudo-target signal for precisely locking the missile receiver onto the desired target signal prior to launch. The $c$ and $x$ channels or receivers function substantially the same as the s channels except, of course, an $x$-band signal does not have to be multiplied.

This completes the description of the preferred embodiments of the invention. However, many modifications will become apparent to those skilled in the art. For example, it is not necessary that all the receiver circuits including the displays in FIG. 4 be duplicated for each receiver. Many of the circuits can be time shared by providing suitable switching means operable by the radar receiver operator. Furthermore, it should be understood that the apparatus is not solely limited to detecting harmonics within the frequency range of the receiver but may equally be utilized to detect subharmonics, anharmonics and spurious signals from the radiating source which are within the frequency range of the receiver.

Accordingly, it is desired that the appended claims be given a broad interpretation commensurate with the scope of the invention within the art.

What is claimed is:

1. A missile guidance system comprising:
   a homing missile and an acquisition radar receiver;
   receiver means in said missile responsive to harmonics of radiating source signals for providing an error signal proportional to the location of said source with respect to said missile;
   and means in said acquisition radar receiver for selecting a radiating source and providing source discrimination signals to said receiver means.

2. An object locating system comprising:
   receiver means having a finite frequency range responsive to radiation from objects to be located;
   modulating means for modulating said radiation with information indicative of the location of said radiating objects with respect to a reference coordinate;
   and means for frequency tuning said receiver means to the frequency of the fundamental frequency of said radiation within the receiver bandwidth or the harmonics of said radiation within the receiver bandwidth including means for providing said receiver means with a reproduced signal proportional to the frequency of the fundamental frequency or the harmonics.

3. A missile guidance system including a missile and a radar device comprising:
   receiver means in said missile responsive to harmonics of radiating source signals for providing an error signal proportional to the location of said source;

and means in said radar device for providing said receiver means with a reproduced signal proportional to the frequency of signals from a selected radiating source.

4. A guidance system for locating and directing a vehicle towards radiating sources which sources emit radiation having either a fundamental or harmonic frequency within the bandwidth of receiver means located in said vehicle comprising:
- a narrow beam conically scanned antenna for amplitude modulating received signals with directional information from sources located within the beamwidth of said antenna;
- a broad-beam antenna coupled to said narrow beam antenna and having a gain characteristic intermediate the gain characteristic of signals received within the main-lobe and the side-lobes of said narrow beam antenna;
- a first receiver means coupled to said narrow beam antenna;
- a second receiver means coupled to said wide beam antenna;
- and difference means coupled to said first and second receivers for producing an output signal of a predetermined polarity in time coincidence with signals received through the main-lobe of said narrow beam antenna.

5. The apparatus of claim 4 including means responsive to the output signal from said difference means for suppressing received signals caused by multi-path transmission of said radiation.

6. A missile guidance system including a missile and a radar receiver device comprising:
- receiver means in said missile responsive to harmonics of radiating source signals for providing an error signal proportional to the location of said source;
- and means in said radar receiver device for providing to said receiver means a reproduced signal proportional to harmonics of the frequency of signals from a selected radiating source.

7. The apparatus of claim 6 including means in said receiver for gating said radiating source signals at a pseudo-pulse repetition rate.

8. A missile guidance system including a missile and a radar receiver device comprising:
- receiver means in said missile responsive to harmonics of radiating source signals for providing an error signal proportional to the location of said source;
- means in said radar receiver device for providing to said receiver means a reproduced signal proportional to harmonics of the frequency of signals from a selected radiating source;
- and means for tuning said receiver means to the frequency of harmonics of said selected radiating source.

9. A guidance system for locating and directing a vehicle towards radiating sources which sources emit radiation having either a fundamental or harmonic frequency within the bandwidth of receiver means located in said vehicle comprising:
- a narrow beam conically scanned antenna for amplitude modulating received signals with directional information from sources located within the beamwidth of said antenna;
- a broad beam antenna coupled to said narrow beam antenna and having a gain characteristic intermediate the gain characteristic of signals received within the main-lobe and the side-lobes of said narrow beam antenna;
- a first receiver means coupled to said narrow beam antenna;
- a second receiver means coupled to said wide beam antenna;
- difference means coupled to said first and second receivers for producing an output signal of a predetermined polarity in time coincidence with signals received through the main-lobe of said narrow beam antenna;
- and means for suppressing signals caused by multi-path transmission of said received signals.

10. A missile guidance system including a missile and a radar device comprising:
- receiver means in said missile responsive to harmonics of radiating source signals for providing an error signal proportional to the location of said source, said receiver means including a narrow beamwidth antenna having a main-lobe gain which is greater than the side-lobe gain;
- means in said radar device for providing said receiver means with a reproduced signal proportional to the frequency of signals from a selected radiating source;
- and means for rejecting signals coupled to said receiver through the side-lobe of said antenna.

11. The method of locating radiating sources comprising the steps of:
- receiving radiation in a receiver means from said sources lying in a predetermined frequency band;
- modulating said received radiation with directional information proportional to the deviation of the source of said radiation from a frame of reference;
- frequency discriminating fundamentals and harmonics of the radiation from said sources which lie within the frequency range of said receiver means;
- extracting the directional information on the received radiation passed through said receiver means;
- and tuning said receiver means to a selected source by coupling a harmonic or fundamental reproduced from the radiation of said selected source to said receiving means.

12. A missile guidance system comprising:
- a homing missile and an acquisition radar receiver;
- receiver means in said missile responsive to either harmonics or fundamentals of radiating source signals for providing an error signal proportional to the location of said source with respect to said missile, said receiver means including an antenna coupled to a mixer means, a variable local oscillator coupled to said mixer for providing an intermediate frequency output signal from said mixer proportional to the input signal to said mixer means from said antenna;
- and apparatus in said acquisition radar receiver for selecting a radiating source and providing source discrimination signals to said receiver means, said apparatus including means for providing a signal proportional to the frequency of signals from said selected source.

13. A missile guidance system comprising:
a homing missile and an acquisition radar receiver;
receiver means in said missile responsive to either harmonics or fundamentals of radiating source signals for providing an error signal proportional to the location of said source with respect to said missile, said receiver means including an antenna coupled to a mixer means, a variable local oscillator coupled to said mixer for providing an intermediate frequency output signal from said mixer proportional to the input signal to said mixer means from said antenna;
and apparatus in said acquisition radar receiver for selecting a radiating source and providing source discrimination signals to said receiver means, said apparatus including means for providing a signal proportional to the harmonic or fundamental frequency of signals from said selected source, which harmonic or fundamental is within the frequency range of said receiver means.

14. In combination:
a high frequency radar receiver for providing a signal proportional to the location of sources of radiation generating signals within the frequency range of said receiver means;
and an acquisition radar device for coupling a signal to said radar receiver within the frequency band of said high frequency radar, which signal is derived from source signals at a lower frequency than the frequency range of said radar receiver.

15. An object locating system comprising:
receiver means having a finite frequency range responsive to radiations from objects to be located, said radiations being signals having either a fundamental or a harmonic within the frequency range of said receiver means;
modulating means for modulating said radiation with information indicative of the location of said radiating objects with respect to a reference coordinate;
and means for frequency tuning said receiver means to the frequency of the fundamental frequency of said radiation within the receiver bandwidth or the harmonics of said radiation within the receiver bandwidth including means for providing said receiver means with a reproduced signal proportional to the frequency of the fundamental frequency or the harmonics.

16. The method of locating radiating sources comprising the steps of:
receiving radiation in a receiver means from said sources lying in a predetermined frequency band;

modulating said received radiation with directional information proportional to the deviation of the source of said radiation from a frame of reference;

and tuning said receiver means to a selected source by coupling a harmonic or fundamental reproduced from the radiation of said selected source to said receiving means.

17. A source locating system comprising:
a receiver means responsive to harmonics of radiating source signals for providing an error signal proportional to the location of said source with respect to said receiver means;
and an acquisition radar receiver means for selecting a radiating source and providing source discrimination signals to said receiver means.

* * * * *